(12) United States Patent
Park et al.

(10) Patent No.: US 7,754,805 B2
(45) Date of Patent: Jul. 13, 2010

(54) POLYMER RESIN COMPOSITION AND METHOD OF PREPARING THE SAME

(75) Inventors: Chung Hae Park, Le Havre (FR); Si Hwan Park, Hwaseong-si (KR); Worl Yong Kim, Daejeon (KR); Sun Woo Kim, Daejeon (KR); Eon Seok Lee, Daejeon (KR)

(73) Assignee: LG Chem, Ltd. (KR)

( * ) Notice: Subject to any disclaimer, the term of this patent is extended or adjusted under 35 U.S.C. 154(b) by 270 days.

(21) Appl. No.: 11/432,000

(22) Filed: May 11, 2006

(65) Prior Publication Data

US 2006/0293433 A1     Dec. 28, 2006

(30) Foreign Application Priority Data

May 11, 2005  (KR) .............. 10-2005-0039099
Aug. 24, 2005  (KR) .............. 10-2005-0078050

(51) Int. Cl.
*C08K 3/36* (2006.01)
*C08K 3/14* (2006.01)
*C08K 3/10* (2006.01)
*C08K 3/28* (2006.01)
*C08K 3/38* (2006.01)

(52) U.S. Cl. .............. 524/493; 524/847; 524/404; 524/424; 524/437; 428/407; 523/210; 523/351

(58) Field of Classification Search .............. 524/494, 524/425, 445, 492, 404, 424, 847, 493, 437
See application file for complete search history.

(56) References Cited

U.S. PATENT DOCUMENTS

| 5,530,051 | A | 6/1996 | Hirata et al. |
| 6,846,533 | B2 * | 1/2005 | Wu et al. ............. 428/35.7 |
| 7,241,503 | B2 * | 7/2007 | Noguchi ............. 428/403 |

(Continued)

FOREIGN PATENT DOCUMENTS

EP     265 075 A2 *   4/1988

(Continued)

OTHER PUBLICATIONS

JP 2005-105253 (Apr. 2005) abstract and translation in English.*

(Continued)

*Primary Examiner*—David Wu
*Assistant Examiner*—Rip A. Lee
(74) *Attorney, Agent, or Firm*—Cantor Colburn LLP

(57) ABSTRACT

Provided are a polymer resin composition and a method of preparing the same. The polymer resin composition includes: a polymer resin; 0.01-10.0 parts by weight of flaky pigment particles having an inverse aspect ratio of 0.01-0.1 based on 100 parts by weight of the polymer resin; and 0.01-10.0 parts by weight of polyhedral pigment particles having an inverse aspect ratio of 0.300-0.999 based on 100 parts by weight of the polymer resin. Using the polymer resin composition, a polymer resin molded product having excellent appearance, i.e., having a uniform color even in resin flow lines or resin weld lines, and in which there is no degradation in the physical properties of the polymer resin contained therein can be manufactured at a low cost.

13 Claims, 3 Drawing Sheets

U.S. PATENT DOCUMENTS

2006/0156949 A1 * 7/2006 Pfaff et al. ............... 106/31.9

FOREIGN PATENT DOCUMENTS

| | | | |
|---|---|---|---|
| JP | 4-359937 A | * | 12/1992 |
| JP | 7-304899 | * | 11/1995 |
| JP | 1995-304899 | | 11/1995 |
| JP | 07304899 | | 11/1995 |
| JP | 8-109340 | * | 4/1996 |
| JP | 08-109340 | | 4/1996 |
| JP | 1996-109340 | | 4/1996 |
| JP | 08109340 | | 4/1996 |
| JP | 8-120115 | * | 5/1996 |
| JP | 9-194630 | * | 7/1997 |
| JP | 09-194630 | | 7/1997 |
| JP | 1997-194630 | | 7/1997 |
| JP | 09194630 | | 7/1997 |
| JP | 10-265676 | | 10/1998 |
| JP | 1999-279434 | | 10/1999 |
| JP | 11279434 | | 10/1999 |
| JP | 2001-226601 A | * | 8/2001 |
| JP | 2001226601 | | 8/2001 |
| JP | 3627080 | | 12/2004 |
| JP | 2005-105253 | * | 4/2005 |
| JP | 2005105253 | | 4/2005 |
| WO | 2004022601 A2 | | 3/2004 |

OTHER PUBLICATIONS

JP 7-304899 (Nov. 1995) abstract and translation in English.*
JP 9-194630 (Aug. 1997) abstract and translation in English.*
JP 2001-226601 (Matsuda, Aug. 2001) abstract and translation in English.*
European Search Report dated Jun. 3, 2008 for Application No. 06768478.7-2102 (PCT/KR2006001754).
Korean Intellectual Property Office—PCT International Search Report—Date Mailed: Aug. 25, 2006.
Korean Office Action dated Jun. 21, 2007 for Application No. 10-2005-0078050 (All references cited in the Office Action are listed above).

* cited by examiner

POLYMER RESIN COMPOSITION AND METHOD OF PREPARING THE SAME

CROSS-REFERENCE TO RELATED PATENT APPLICATIONS

This application claims the benefit of Korean Patent Application No. 10-2005-0039099, filed on May 11, 2005, and No. 10-2005-0078050, filed on Aug. 24, 2005, in the Korean Intellectual Property Office, the disclosures of which are incorporated herein in their entirety by reference.

BACKGROUND OF THE INVENTION

1. Field of the Invention

The present invention relates to a polymer resin composition and a method of manufacturing the same, and more particularly, to an inexpensive polymer resin composition that provides a uniform color even at resin flow lines or resin weld lines in a molded product manufactured therefrom and which does not deteriorate physical properties of the polymer resin therein, and a method of preparing the same.

2. Description of the Related Art

As customer requirements diversify along with industrial development, the need for polymer resin molded products having an elegant appearance and a high-quality texture increases.

In particular, the appearances of polymer resin molded products have been diversified using special effects providing, for example, metallic textures, pearl textures, holographic textures, marble textures, etc.

Referring to FIG. 1, a method of providing a metallic texture or a pearl texture includes preparing a polymer resin composition that includes a flaky pigment 2 providing such a textual effect and then directly molding the polymer resin composition into a product having a metallic or pearl textured appearance.

Polymeric molded products formed using this method have luminescent properties due to the flaky pigment reflecting light 4. To provide luminosity to such a polymeric molded product, flaky pigment particles 2 that maximize the reflection of light 4 and do not greatly affect the volume or physical properties of a polymer resin are used. This method is cheaper than a conventional spray coating method and does not cause environmental problems associated with conventional spray coating methods.

However, when molding a product using the above-described method using flaky pigment particles 2, the orientation of the flaky pigment particles 2 changes in a resin flow line or a resin weld line 1 in which polymer resin flows intersect or weld, from a direction parallel to a surface of the product to a direction perpendicular to the surface of the product (refer to FIG. 1). As a result, the reflection of light 5 in the resin flow line or resin weld line 1 decreases, thereby resulting in a dark line on the surface of the product degrading the product's appearance.

To eliminate such an appearance-degrading factor, the amount of flaky pigment particles can be reduced. However, reducing the amount of flaky pigment particles results in an attenuate texture. In addition, there has been a suggestion to increase the size of the flaky pigment particles. However, the use of increased flaky pigment particles results in a rough and inferior product appearance.

To solve these problems, as shown in FIG. 2, a method of using polyhedral pigment particles 3 instead of flaky pigment particles has been suggested. The use of polyhedral pigment particles 3 is effective to some extent because polyhedral pigment particles 3 do not greatly affect the reflection of light 4, 6 irrespective of their orientation. However, a much larger amount of polyhedral pigment particles relative to the amount of flaky pigment particles is required to obtain a similar luminosity obtained by flaky pigment particles. Therefore, this method increases the product cost, results in degradation in physical properties such as elongation, impact strength, etc., due to the use of a relatively smaller amount of polymer resin, and increases the weight of the product.

To overcome these problems, experiments have been conducted to increase the luminosity with a smaller amount of polyhedral pigment particles (Japanese Laid-open Nos. 8-109340; 9-194630; and 10-265676). However, there is a substantial limit to increase the luminosity only using polyhedral pigment particles, and thus an improvement is required.

As a result of research continuously performed to solve the above-described problems, the inventors of the present invention have found a method of selectively distributing flaky pigment particles and polyhedral pigment particles in a composition so as not to degrade the appearance of a product manufactured therefrom even in a resin flow line and a resin weld line.

SUMMARY OF THE INVENTION

The present invention provides a polymer resin composition that does not degrade the appearance of a product manufactured therefrom even in a resin flow line and a resin weld line.

The present invention provides a method of preparing the polymer resin composition.

The present invention provides a polymer resin molded product manufactured using the polymer resin composition.

According to an aspect of the present invention, there is provided a polymer resin composition comprising: a polymer resin; 0.01-10.0 parts by weight of flaky pigment particles having an inverse aspect ratio of 0.01-0.1 based on 100 parts by weight of the polymer resin; and 0.01-10.0 parts by weight of polyhedral pigment particles having an inverse aspect ratio of 0.300-0.999 based on 100 parts by weight of the polymer resin.

According to another aspect of the present invention, there is provided a method of preparing a polymer resin composition, the method comprising: preparing master batches by coating flaky pigment particles having an inverse aspect ratio of 0.01-0.1 and polyhedral pigment particles having an inverse aspect ratio of 0.300-0.999 with a polymer resin; and uniformly dry-blending the master batches with a polymer resin.

The present invention also provides a method of preparing a polymer resin composition, the method comprising: preparing master batches by coating flaky pigment particles having an inverse aspect ratio of 0.01-0.1 and polyhedral pigment particles having an inverse aspect ratio of 0.300-0.999 with a polymer resin; and uniformly compounding the master batches with a polymer resin.

According to another aspect of the present invention, there is provided a polymer resin molded product manufactured using the above-described polymer resin composition.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in greater detail.

Figure 1:
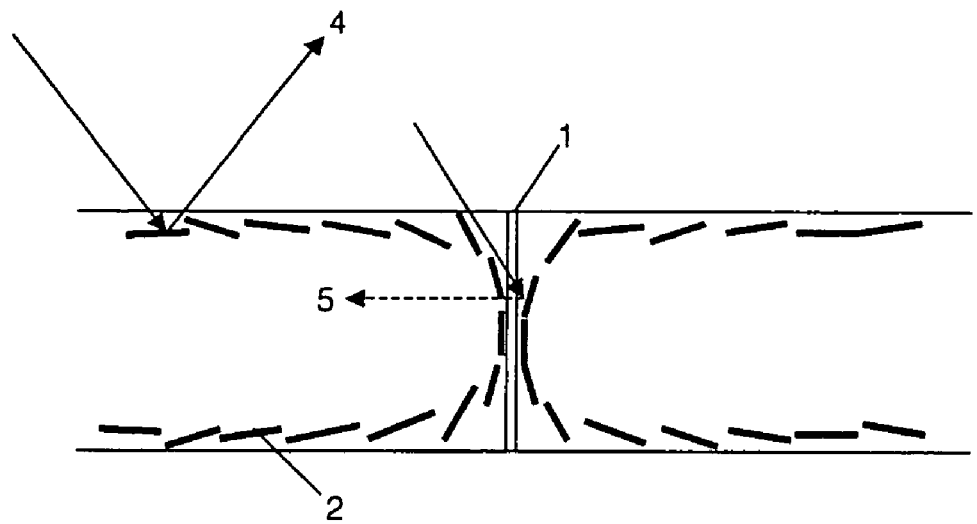
FIG. 1 is a concept view of the paths of light in a product manufactured using a polymer resin composition containing only flaky pigment particles.
Figure 2:
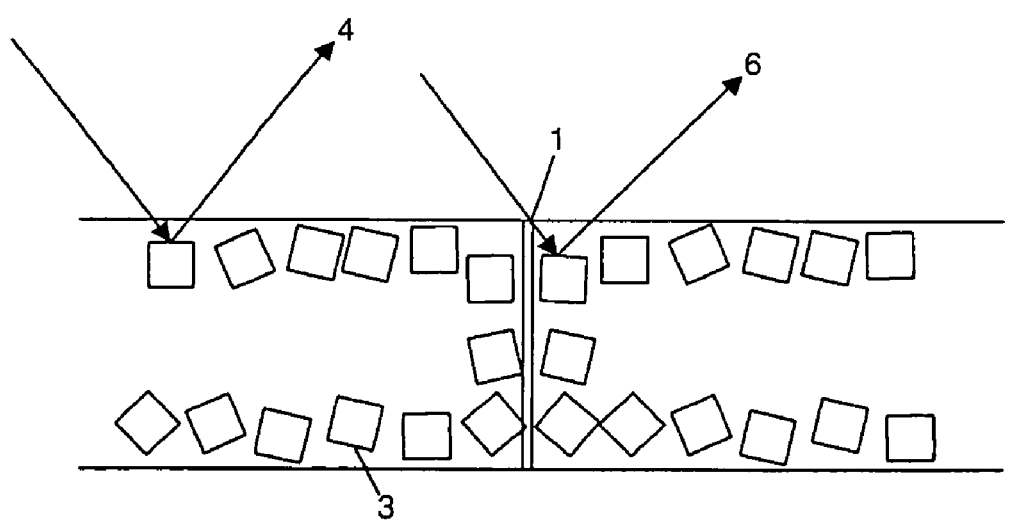
FIG. 2 is a concept view of the paths of light in a product manufactured using a polymer resin composition containing only polyhedral pigment particles.
Figure 3:
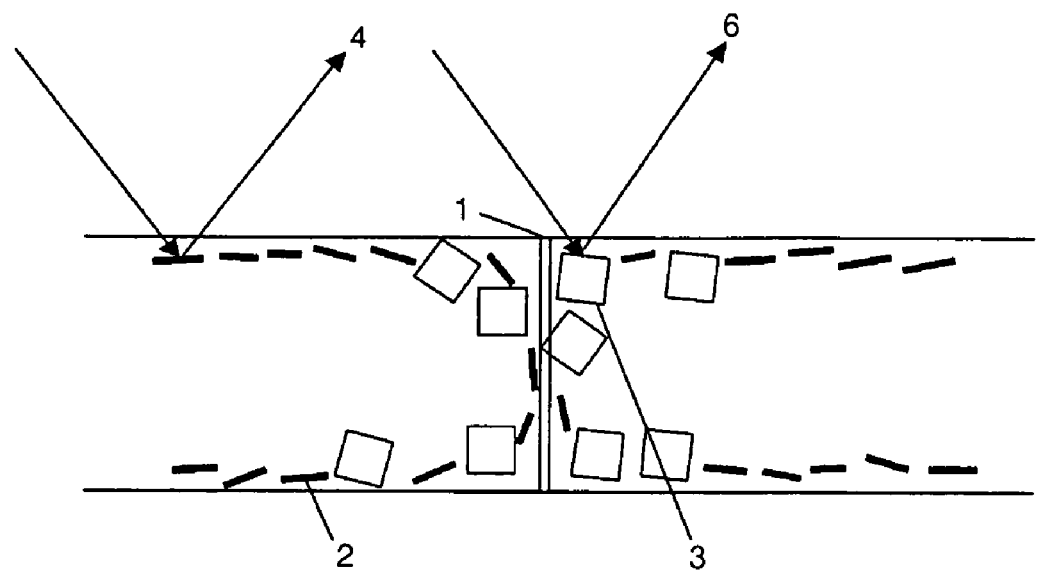
FIG. 3 is a concept view of the paths of light in a product manufactured using a polymer resin composition according to the present invention containing both flaky pigment particles and polyhedral pigment particles.

Referring to FIG. 3, the problems arising with the prior art described above can be solved by a polymer resin composition containing both flaky pigment particles 2 and polyhedral pigment particles 3 so that the polyhedral pigment particles 3 are mainly distributed in a resin flow line or a resin weld line 1 of a polymer resin molded product manufactured from the polymer resin composition and the flaky pigment particles 3 are mainly distributed in the other regions of the polymer resin molded product.

There are no definite criteria for classifying flaky pigment particles and polyhedral pigment particles. In the present invention, pigment particles having an inverse aspect ratio of 0.1 or less are referred to as "flaky pigment particles", and pigment particles having an inverse aspect ratio of 0.3 or greater and at least four facets are referred to as "polyhedral pigment particles". Here, the inverse aspect ratio means the ratio of the smallest diameter to the largest diameter of a particle. Accordingly, the inverse aspect ratio of a spherical particle is "1".

To manufacture a polymer resin molded product that is cheap and has uniform colors in a resin flow line or resin weld line without degrading physical properties of the polymer resin, the present invention provides a polymer resin composition including 0.01-10.0 parts by weight of flaky pigment particles having an inverse aspect ratio of 0.01-0.10 and 0.01-10.0 parts by weight of polyhedral pigment particles having an inverse aspect ratio of 0.300-0.999 based on 100 parts by weight of the polymer resin.

When the amount of the flaky pigment particles is less than 0.01 parts by weight, it is difficult to obtain a special texture effect, such as a metallic texture or a pearl texture, on the surface of the polymer resin molded product. When the amount of the flaky pigment particles is larger than 10.0 parts by weight, physical properties, such as elongation, impact strength, etc., of the polymer resin constituting the polymer resin molded product deteriorates.

When the amount of the polyhedral pigment particles is less than 0.01 parts by weight, the appearance of a polymer resin molded product manufactured using the polymer resin composition, especially in a resin flow line or a resin weld line in the polymer resin molded product, deteriorates. When the amount of the polyhedral pigment particles is greater than 10.0 parts by weight, physical properties, such as elongation, impact strength, etc., of the polymer resin constituting the polymer resin molded product deteriorate.

When the inverse aspect ratio of the flaky pigment particles is smaller than 0.01, the mechanical strength of the polymer resin molded product is so small that it can be can be easily broken. When the inverse aspect ratio of the flaky pigment particles is greater than 0.10, the flaky pigment particles may not be uniformly distributed in the polymer resin composition, the orientation of the flaky pigment particles is less parallel to the surface of a polymer resin molded product, and a special effect, such as a metallic texture or pearl texture effect, is insufficient. When the inverse aspect ratio of the polyhedral pigment particles is smaller than 0.300, the amount of reflected light varies according to the orientation of particles, which results in an inferior product appearance. When the inverse aspect ratio of the polyhedral pigment particles is greater than 0.999, the polyhedral pigment particles are almost spherical, and thus light reflection occurs at points rather than at planes, thereby resulting in a reduction in the amount of reflected light and an inferior product appearance.

Hereinafter, the constitution of the flaky pigment particles will be described.

The flaky pigment particles can be composed of only metallic flakes or can be formed by coating a metal layer on flaky substrates.

Flaky pigment particles composed of only metallic flakes can be formed by shaping spherical metallic powder into a flat form through dry or wet milling. Here, any material can be used for the flaky pigment particles composed of only metallic flakes without limitation. For example, precious metals, such as gold, silver, platinum, palladium, etc., base metals, such as nickel, copper, chromium, tin, etc., or an alloy thereof can be used for the flaky pigment particles.

Examples of a material for the flaky substrate on which a metal layer will be coated include, but are not limited to, glass, calcite, wollastonite, silica, silicon carbide, cubic boron nitride (CBN) abrasive, etc., all of which are in powder form. Examples of the glass include, but are not limited to, element glass, hydrogen bond glass, oxide glass, fluoride glass, chloride glass, sulfide glass, carbonate glass, nitrate glass, sulfate glass, etc.

Any material can be used for the metal layer without limitation provided that a uniform thickness and a desired texture can be attained therewith. Examples of the material for the metal layer include precious metals, such as gold, silver, platinum, palladium, etc., base metals, such as nickel, copper, chromium, tin, etc., or an alloy thereof.

Any method that is known to one of ordinary skill in the art can be used to form a metal layer on flaky substrates. For example, the flaky pigment particles with a metal layer on their flaky substrate can be prepared through, for example, sputtering or fine powder coating, but not limited thereto.

The metal layer may have a thickness of 10-200 nm. When the thickness of the metal layer is smaller than 10 nm, the surface of the substrate cannot be uniformly coated. When the thickness of the metal layer is greater than 200 nm, the metal layer has more uneven portions, and thus the luminosity of the particle decreases.

The flaky pigment particles may have a largest diameter of 10-250 μm. When the largest diameter of the flaky pigment particles is smaller than 10 μm, the flaky pigment particles are too small to provide a special effect, such as a metallic texture effect, etc. When the largest diameter of the flaky pigment particles is larger than 250 μm, the flaky pigment particles are so large that they can be easily recognized, and thus a polymer resin molded product having an elegant appearance cannot be attained therefrom.

Hereinafter, the constitution of the polyhedral pigment particles will be described.

The polyhedral pigment particles may have a structure having a metal layer, which provides a metallic texture or pearl texture effect, on a substrate having an appropriate size and shape. However, when a substrate having a light-reflecting characteristic is used for the polyhedral pigment particles, the polyhedral pigment particles can be composed of only the substrate without the metal layer. Any material can be used for the substrate having a light-reflecting characteristic and not requiring a metal layer without limitation provided that a desired texture effect can be attained therewith. Examples of the material for such a substrate include, but are not limited to, precious metals, such as gold, silver, platinum, palladium, etc., base metals, such as nickel, copper, chromium, tin, etc., an alloy thereof, etc.

Examples of a material for the substrate of the polyhedral pigment particles with a metal layer include glass, calcite, wollastonite, silica, wafer fragments, silicon carbide, cubic boron nitride (CBN) abrasive, aluminum nitride, etc., all of which are in powder form. Examples of the glass include, but are not limited to, element glass, hydrogen bond glass, oxide glass, fluoride glass, chloride glass, sulfide glass, carbonate glass, nitrate glass, sulfate glass, etc.

When glass is used for the substrate of the polyhedral pigment particles, glass powder having a specific particle diameter distribution is prepared through mechanical pulverization using, for example, a ball mill, a jet mill, an attriter, a sand mill, a sample mill, etc. In general, a narrower particle diameter distribution leads to a more uniform product appearance. However, the particle diameter distribution of glass powder can be appropriately varied if required.

Any material can be used for the metal layer of the polyhedral pigment particles without limitation provided that a uniform thickness and a desired texture can be attained therewith. Examples of the material for the metal layer include precious metals, such as gold, silver, platinum, palladium, etc., base metals, such as nickel, copper, chromium, tin, etc., or an alloy thereof.

Any method that is known to one of ordinary skill in the art can be used to form a metal layer on substrates for the polyhedral pigment particles. For example, the polyhedral pigment particles with a metal layer on their polyhedral substrate can be prepared through, for example, sputtering, electroless plating, vacuum deposition, or fine powder coating, but not limited thereto.

The metal layer of the polyhedral pigment particles may have a thickness of 10-200 nm. When the thickness of the metal layer is smaller than 10 nm, the surface of the substrate cannot be uniformly coated. When the thickness of the metal layer is greater than 200 nm, the roughness of the metal layer increases, and thus the luminosity of the particle decreases.

The polyhedral pigment particles may have a largest diameter of 20-500 μm. When the largest diameter of the polyhedral pigment particles is smaller than 20 μm, the polyhedral pigment particles are too small to provide a special effect, such as a metallic texture effect, etc. When the largest diameter of the polyhedral pigment particles is larger than 500 μm, the polyhedral pigment particles are so large that they can be easily recognized, and thus a polymer resin molded product having an elegant product appearance cannot be attained therefrom.

To increase the luminosity of the flaky pigment particles and the polyhedral pigment particles, edges of the flaky pigment particles and the polyhedral pigment particles can be processed into round shapes, which less scatter light than shape edges. The edges of the flaky pigment particles and/or the polygonal pigment particles may be processed into round shapes through, for example, grinding. Any grinding method that is known to one of ordinary skill in the art can be used.

However, when the edges of the polyhedral pigment particles are excessively grounded into almost spherical shapes and facets of the polyhedral pigment particles are damaged, the reflection of light decreases, and thus the appearance of a product manufactured therefrom rather degrades. Thus, the degree of grinding the edges of the polyhedral pigment particles has to be appropriately controlled not to be excessive and damage the facets of the polyhedral pigment particles.

The polyhedral pigment particles may have 4-12 facets, for example, 6-10 facets. When the number of facets of the polyhedral pigment particles is less than 4, the amount of reflected light seriously changes according to the orientation of the polyhedral pigment particles. When the number of facets of the polyhedral pigment particles is greater than 12, the area of each facet is too small to reflect a sufficient amount of light, which degrades the appearance of a product manufactured from the polyhedral pigment particles.

Examples of the polymer resin mixed with the flaky pigment particles and the polyhedral pigment particles include, but are not limited thereto, thermoplastic and thermoset resins such as polyethylene, polypropylene, ABS resin, AES resin, AS resin, acrylic resin, polystyrene resin, polyvinylchloride, polymethylpentene, polyamide, polyethylene terephthalate, polyarylate, polyacetal resin, polycarbonate, polyphenylene ether, polysulfone, polyphenylenesulfide, polyethersulfone, polybutadiene, a mixture thereof, a copolymer thereof, a modified product thereof, etc. Specifically, highly transparent polymer resins, such as ABS resin, PMMA resin, AS resin, acrylic resin, polystyrene, polycarbonate, PVC resin, etc., can be used.

Any method that is known to one of ordinary skill in the art as a method by which the flaky pigment particles and polyhedral pigment particles can be uniformly mixed with the polymer resin can be used without limitation. For example, a mixture of the flaky pigment particles and polyhedral pigment particles with the polymer resin can be dry-blended or compounded after being formed as a master batch.

A direct mixing method includes adding the flaky pigment particles and the polyhedral pigment particles into a polymer resin and mixing the mixture using, for example, a tumbler, a blender, a banbury mixer, a mill roll, etc., to uniformly distribute the flaky pigment particles and the polyhedral pigment particles in the polymer resin.

A mixing method using master batches includes coating the surfaces of the flaky pigment particles and the polyhedral pigment particles with a polymer resin to form master batches and dispersing the master batches in a bulk polymer resin. This method provides good dispersibility and prevents chemical and/or physical damage of the flaky pigment particles and the polyhedral pigment particles.

Compounding is a method of uniformly mixing the flaky pigment particles and the polyhedral pigment particles with a polymer resin in, for example, an extruder, while melting the polymer resin. Here, instead of the flaky pigment particles and the polyhedral pigment particles, master batches thereof can be used.

A stabilizer, a dispersing agent, a UV-absorbing agent, an easy-releasing agent, etc., can be added into the polymer resin provided that a quality product appearance and a special texture effect are ensured.

A polymer resin molded product can be manufactured using the polymer resin composition described above in which the flaky pigment particles and the polyhedral pigment particles are dispersed in the polymer resin. Any method that is known to one of ordinary skill in the art can be used without limitation to manufacture the polymer resin molded product.

Although the flaky pigment particles and the polyhedral pigment particles are uniformly dispersed in the polymer resin composition, the distribution of the flaky pigment particles and polyhedral pigment particles is locally varied, especially near a resin flow line or resin weld line of a polymer resin molded product, in a process of manufacturing the polymer resin molded product. While the density of the flaky pigment particles is maintained almost constant in the polymer resin composition, the density of the polyhedral pigment particles is much higher near the resin flow line or resin weld line of the polymer resin molded product than other regions. Thus, a sufficiently amount of light can be reflected near the resin flow line or resin weld line and no dark line, which degrades the appearance of the product, appear on the surface of the product.

Hereinafter, the present invention will be described in greater detail with reference to the following examples. The following examples are for illustrative purposes only and are not intended to limit the scope of the invention.

Example 1

A transparent ABS resin (ABS TR557, available from LG Chem. Ltd.) was used as a polymer resin of a polymer resin composition. 0.4 parts by weight of flaky pigment particles and 3 parts by weight of polyhedral pigment particles based on 100 parts by weight of the polymer resin were added. Aluminum flakes having an average diameter of 135 μm were used as the flaky pigment particles. The polyhedral pigment particles were obtained by coating glass fragments with silver and had an average particle diameter of 70 μm and an inverse aspect ratio of 1-0.2.

Figure 4:
FIG. 4 is a photograph of a surface of a polymer resin molded product manufactured in Example 1 according to the present invention.

FIG. 4 is a photograph of a surface of a polymer resin molded product manufactured using the polymer resin composition of Example 1.

Example 2

A 5:5 mixture of a transparent ABS resin (ABS TR557, available from LG Chem. Ltd.) and a high impact strength, high glossy ABS resin (ABS HG173, available from LG Chem. Ltd.) was used as a polymer resin of a polymer resin composition. 0.4 parts by weight of flaky pigment particles and 3 parts by weight of polyhedral pigment particles based on 100 parts by weight of the polymer resin were added. Aluminum flakes having an average particle diameter of 135 μm were used as the flaky pigment particles. The polyhedral pigment particles were obtained by coating glass fragments with silver and had an average particle diameter of 70 μm and an inverse aspect ratio of 1-0.2.

Comparative Example 1

A transparent ABS resin was used as a polymer resin of a polymer resin composition. 0.7 parts by weight of flaky pigment particles based on 100 parts by weight of the polymer resin were added. Aluminum flakes having an average particle diameter of 45 μm were used as the flaky pigment particles.

Figure 5:
FIG. 5 is a photograph of a surface of a polymer resin molded product manufactured in Comparative Example 1.

FIG. 5 is a photograph of a surface of a polymer resin molded product manufactured using the polymer resin composition of Comparative Example 1.

Comparative Example 2

A transparent ABS resin was used as a polymer resin of a polymer resin composition, and flaky pigment particles of different sizes were added into the polymer resin. 0.9 parts by weight of aluminum flakes having an average particle diameter of 135 μm and 0.3 parts by weight of aluminum flakes having an average particle diameter of 60 μm based on 100 parts by weight of the polymer resin were added.

Comparative Example 3

A polymer resin composition was prepared in the same manner as in Comparative Example 1, except that 3 parts by weights of polyhedral pigment particles instead of the flaky pigment particles were used. The polyhedral pigment particles were obtained by coating glass fragments with silver and had an average particle diameter of 70 μm and an inverse aspect ratio of 1-0.2.

Using polymer resin molded products manufactured using the polymer resin compositions of Examples 1 and 2 and Comparative Examples 1, 2, and 3, whether a resin weld line appears and whether the molded products have a metallic texture were observed with the naked eye and evaluated according to the following criteria.

[Resin Weld Line Observation]
◎: No resin weld line appeared.
○: Indistinct resin weld line appeared.
Δ: Visible resin weld line appeared.
x: Distinct resin weld line appeared.
There is no practical problem at the grade indicated by ◎ or ○, wherein the grade indicated by ◎ is most desirable.

[Metallic Texture Evaluation]
◎: Excellent metallic texture as can be obtained through spray coating.
○: Good metallic texture
Δ: Inferior metallic texture
x: No metallic texture
There is no practical problem at the grade indicated by ◎ or ○, wherein the grade indicated by ◎ is most desirable.

The evaluated results are shown in Table 1.

TABLE 1

|  | Example 1 | Example 2 | Comparative Example 1 | Comparative Example 2 | Comparative Example 3 |
| --- | --- | --- | --- | --- | --- |
| Resin weld line | ○ | ○ | X | Δ | ○ |
| Metallic texture | ○ | ○ | ◎ | ○ | Δ |

As is apparent from Table 1 above, the polymer resin compositions of Examples 1 and 2 according to the present invention caused no practical problem in terms of the formation of resin weld lines and the metallic texture of products manufactured therefrom. Although the polymer resin molded product manufactured using the polymer resin composition of Comparative Example 1 had excellent metallic texture, a distinct resin weld line also appeared in the polymer resin molded product manufactured in Comparative Example 1. In addition, the polymer resin molded product manufactured using the composition of Comparative Example 2 had good metallic texture but also had a resin weld line. The polymer resin molded product manufactured using the composition of Comparative Example 3 had in distinct resin weld lines but had inferior metallic texture.

As described above, using the polymer resin composition according to the present invention, a polymer resin molded product having excellent appearance, i.e., having a uniform color even in resin flow lines or resin weld lines, and in which there is no decrease in the physical properties of a polymer resin contained therein can be manufactured at a low cost.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polymer resin composition comprising:
   a polymer resin;
   0.01-10.0 parts by weight of flaky pigment particles having an inverse aspect ratio of 0.01-0.1 based on 100 parts by weight of the polymer resin; and
   0.01-10.0 parts by weight of polyhedral pigment particles having an inverse aspect ratio of 0.300-0.999 based on 100 parts by weight of the polymer resin,
   wherein the polyhedral pigment particles comprise a substrate and a metal layer coated on the substrate, and the substrate is formed of a material selected from the group consisting of silica, silicon carbide, cubic boron nitride (CBN) abrasive, and aluminum nitride, all of which are in powder form.

2. The polymer resin composition of claim 1, wherein the flaky pigment particles have a largest diameter of 10-250 μm.

3. The polymer resin composition of claim 1, wherein the polyhedral pigment particles have a largest diameter of 20-500 μm.

4. The polymer resin composition of claim 1, wherein the flaky pigment particles have an inverse aspect ratio of 0.03-0.08.

5. The polymer resin composition of claim 1, wherein the polyhedral pigment particles have an inverse aspect ratio of 0.40-0.85.

6. The polymer resin composition of claim 1, wherein the flaky pigment particles comprise a substrate and a metal layer coated on the substrate.

7. The polymer resin composition of claim 6, wherein the substrate is formed of a material selected from the group consisting of glass, calcite, wollastonite, silica, silicon carbide, and a cubic boron nitride (CBN) abrasive, all of which are in powder form.

8. The polymer resin composition of claim 6, wherein the metal layer has a thickness of 10-200 nm.

9. The polymer resin composition of claim 1, wherein the polyhedral pigments have 4-12 facets.

10. A method of preparing a polymer resin composition, the method comprising:
    preparing a master batch comprising: flaky pigment particles having an inverse aspect ratio of 0.01-0.1; and polyhedral pigment particles having an inverse aspect ratio of 0.300-0.999, wherein the polyhedral pigment particles comprise a substrate and a metal layer coated on the substrate, and the substrate is formed of a material selected from the group consisting of silica, silicon carbide, cubic boron nitride (CBN) abrasive, and aluminum nitride, all of which are in powder form; and
    and uniformly dry-blending the master batch with a polymer resin,
    wherein the amount of the flaky pigment particles is in a range of 0.01-10.0 parts by weight based on 100 parts by weight of the polymer resin, and the amount of the polyhedral pigment particles is in a range of 0.01-10.0 parts by weight based on 100 parts by weight of the polymer resin.

11. A method of preparing a polymer resin composition, the method comprising:
    preparing a master batch comprising: flaky pigment particles having an inverse aspect ratio of 0.01-0.1; and polyhedral pigment particles having an inverse aspect ratio of 0.300-0.999, wherein the polyhedral pigment particles comprise a substrate and a metal layer coated on the substrate, and the substrate is formed of a material selected from the group consisting of silica, silicon carbide, cubic boron nitride (CBN) abrasive, and aluminum nitride, all of which are in powder form; and
    uniformly compounding the master batch with a polymer resin,
    wherein the amount of the flaky pigment particles is in a range of 0.01-10.0 parts by weight based on 100 parts by weight of the polymer resin, and the amount of the polyhedral pigment particles is in a range of 0.01-10.0 parts by weight based on 100 parts by weight of the polymer resin.

12. The method of claim 10 or 11, further comprising grinding edges of the flaky pigment particles and the polyhedral pigment particles.

13. A polymer resin molded product comprising the polymer resin composition of any one of claims 1-7.

* * * * *